United States Patent [19]

Screen

[11] 4,455,707
[45] Jun. 26, 1984

[54] CASTOR WITH BRAKING MEANS

[75] Inventor: Stafford T. Screen, Stourbridge, England

[73] Assignee: British Castors Limited, West Bromwich, England

[21] Appl. No.: 303,717

[22] PCT Filed: Feb. 6, 1981

[86] PCT No.: PCT/GB81/00015
§ 371 Date: Sep. 21, 1981
§ 102(e) Date: Sep. 21, 1981

[87] PCT Pub. No.: WO81/02273
PCT Pub. Date: Aug. 20, 1981

[30] Foreign Application Priority Data

Feb. 12, 1980 [GB] United Kingdom ............ 8004666

[51] Int. Cl.³ ............................................ B60B 33/00
[52] U.S. Cl. .................................. 16/35 R; 16/31 R; 16/40; 16/44
[58] Field of Search ............ 188/1.12; 16/35 R, 31 R, 16/31 A, 44, 40, 43, 47, 48

[56] References Cited

U.S. PATENT DOCUMENTS

| 3,914,821 | 10/1975 | Screen | 16/35 R |
| 4,120,071 | 10/1978 | Crescenzi | 16/47 X |
| 4,212,092 | 7/1980 | Ferrari | 16/35 R |
| 4,219,904 | 9/1980 | Melara | 16/47 |

FOREIGN PATENT DOCUMENTS

| 2638365 | 3/1978 | Fed. Rep. of Germany . | |
| 2737650 | 3/1979 | Fed. Rep. of Germany . | |
| 2746891 | 4/1979 | Fed. Rep. of Germany . | |
| 2906734 | 9/1979 | Fed. Rep. of Germany | 16/47 |
| 2365450 | 4/1978 | France . | |
| 1506584 | 4/1978 | United Kingdom | 16/35 R |

Primary Examiner—Mark Rosenbaum
Attorney, Agent, or Firm—Parmelee, Miller, Welsh & Kratz

[57] ABSTRACT

A castor body comprises integral upper and lower parts (15,21) which can undergo limited relative vertical movement by flexing of arms (25) and (26) of the body. An axle (11) for wheels of the castor is carried in the lower body part and the upper body part has braking elements (27,28) with which the wheels engage when the upper body part is moved upwardly by a spring (24) acting between the body parts.

5 Claims, 2 Drawing Figures

CASTOR WITH BRAKING MEANS

TECHNICAL FIELD

This invention relates to a castor of the kind comprising a body, attachment means for mounting the body on an article of furniture for pivoting about a substantially upright axis in use, rolling means mounted on the body for rotation relative thereto about a rolling axis which is transverse to and offset from the pivoting axis and a brake element on the body, wherein the rolling means is movable upwardly and downwardly relative to the body into and out of engagement with the brake element. When the rolling means is engaged with the brake element, rotation of the rolling means is inhibited. When the rolling means is clear of the brake element, the rolling means is freely rotatable.

BACKGROUND ART

One example of a castor of the kind referred to is disclosed in German Patent Specification No. 27 37 650. In this specification, there is described a castor having a body which comprises two parts, namely an upper part having the attachment means and the brake element and a lower part in which there is mounted an axle carrying two wheels which constitute the rolling means. The upper and lower body parts are united by an integral hinge portion situated adjacent to the peripheries of the wheels and remote from the attachment means. The hinge portion is elastically resilient. By flexing of the hinge portion, the lower body part and wheels can move downwardly relative to the upper body part to bring the wheels into engagement with the brake element and can move upwardly relative to the upper body part to disengage the wheels from the brake element.

It is disclosed in the aforesaid German specification that the hinge portion is sufficiently strong to support the load of the upper body part and of the weight of the piece of furniture to which the castor is fitted, without permitting the wheels to become disengaged from the brake elements.

DISCLOSURE OF INVENTION

According to the present invention, there is provided a castor comprising an upper body part provided with a brake element and attachment means for use in mounting the upper body part on an article of furniture for pivoting relative thereto about a pivot axis which is substantially upright in use of the castor, rolling means which is rotatable, in use, relative to the upper body part about a rolling axis transverse to and offset from the pivot axis, and further comprising a lower body part on or in which the rolling means is mounted, wherein the lower body part is flexible, the upper and lower body parts are integral with each other and the upper and lower body parts are united at two positions spaced in opposite directions from a plane which contains the rolling axis and which is parallel to the pivot axis.

The attachment means may be a socket for receiving an attachment spindle or may be an attachment spindle engageable in a socket provided in the furniture or other article with which the castor is to be used.

By uniting the upper and lower body parts at two spaced positions and relying upon flexing of the lower body part to permit movement of the rolling means relative to the upper body part, rather than relying upon a hinge connection between the body parts, we have achieved a castor wherein the lower body part and rolling means is better located relative to the upper body part than would be the case with a castor as disclosed in the aforesaid German specification.

BRIEF DESCRIPTION OF THE DRAWING

An example of a castor embodying the invention will now be described with reference to the accompanying drawing wherein.

PREFERRED EMBODIMENT

Figure 1:
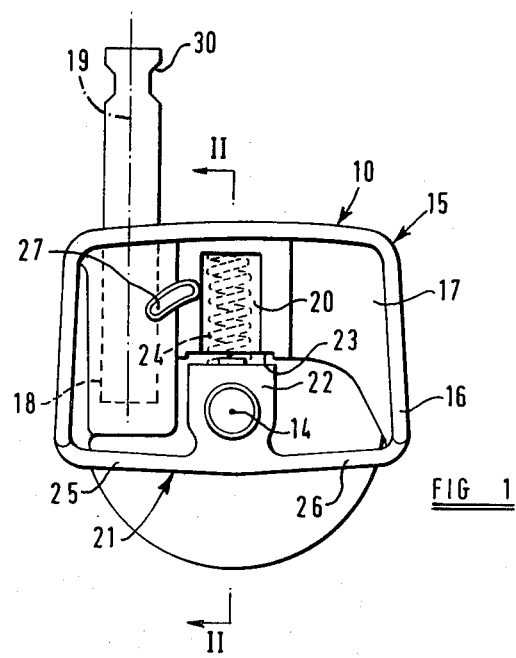
FIG. 1 shows a side view of the castor with one wheel ommitted.
Figure 2:
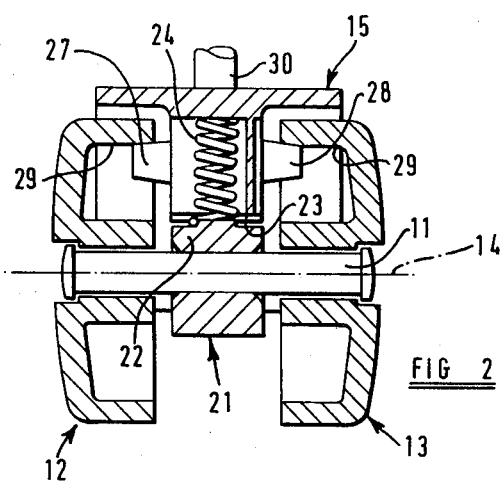
FIG. 2 shows the parts of FIG. 1 in cross-section on the line II—II.

The castor shown in the accompanying drawing has a body 10 formed of a material with some degree of resilient flexibility (for example a nylon), an axle 11 mounted in the body and a pair of wheels 12 and 13 carried on opposite end portions of the axle. The wheels constitute the rolling means hereinbefore mentioned and are rotatable about a rolling axis 14 which is horizontal in use. As shown, the wheels may be retained on the axle by riveting of the axle at its ends, there being provided a sufficient clearance to permit of rotation of each wheel relative to the axle.

The body 10 comprises an upper part 15 including a hood portion 16 which extends over the wheels 12 and 13 and over the gap between them. Within the hood portion, there is an upright web 17 formed with a first enlargement in which there is provided an upwardly open socket 18 to receive an attachment spindle 30 whereby the castor can be attached to an article of furniture for pivoting relative thereto about an upright pivot axis 19. A further enlargement in the web 17 contains a downwardly open socket 20 which faces towards the axle 11 and is also open at one of its sides.

The pivot axis 19 is perpendicular to but is offset from the rolling axis 14 in a direction which is perpendicular to both of the axes.

The body 10 further comprises a lower part 21 including a spigot 22 which can enter a lower end portion of the socket 20 and has a flat upper end face for engaging a flat seat 23 in the socket. A spring 24 is disposed in the socket 20 and engaged with both the upper end face of the spigot 22 and an upper end wall of the socket 20. The spring is intersected by the vertical plane containing the rolling axis 14, half of the spring lying on each side of this plane. The spring urges the upper body part 15 upwardly relative to the lower body part 21. The axle 11 extends through a bore formed in the spigot 22.

The lower body part 21 further comprises a pair of limbs 25 and 26 which lie at a level below that of the axle 11 and extend from the spigot 22 in opposite directions transverse to the rolling axis 14 to the upper body part at respective positions spaced equally in opposite directions from a vertical plane containing the rolling axis. As shown in the drawing, the lower body part 21 is symmetrical about said vertical plane.

The upper and lower body parts 15 and 21 respectively are integral with each other and are formed as a one-piece moulding of plastics material. Relative upward and downward movement of the body parts is accommodated by flexing of the limbs 25 and 26 which lie between the wheels 12 and 13.

The upper body part 15 further comprises a pair of brake elements 27 and 28 which project into the interior of the hollow wheels 12 and 13 respectively. When the upper body part is in the position relative to the lower body part illustrated in the drawing, the brake elements engage with peripheral walls 29 of the wheels and inhibit rotation thereof about the rolling axis. The spring 24 establishes this braked condition of the castor when the article of furniture to which the castor is fitted does not bear any substantial load.

When a further load is applied to the article of furniture, the spring 24 is compressed and the spigot 22 moves into engagement with the seat 23. The brake elements 27 and 28 are then clear of the peripheral walls 29 of the wheels and the wheels can rotate freely.

That part of the spigot 22 which is received in the socket 20 when the spigot engages the seat 23 has flat faces presented transversely of the pivoting axis 19. Typically, the cross-section of the spigot in a horizontal plane is square. The lower end portion of the socket 20 has three complementary flat surfaces which engage with three of these flat surfaces of the spigot to restrain relative rotation of the upper and lower body parts about a vertical axis when the castor is subjected to a substantial additional downward load and is also subjected to a turning moment about the pivoting axis.

For ease of assembly of the spring 24 with the body, the socket 20 may be open at one side, as shown in the drawing. The end of the spring which engages the spigot 22 may be located by a small projection on the spigot.

I claim:

1. A castor comprising an upper body part provided with a brake element and attachment means for use in mounting the upper body part on an article of furniture for pivoting relative thereto about a pivot axis which is substantially upright in use of the castor, rolling means which is rotatable, in use, relative to the upper body part about a rolling axis transverse to and offset from the pivot axis, a flexible lower body part to which the rolling means is mounted and with respect to which the rolling axis is fixed and a spring interposed between the upper body part and the lower body part, wherein the upper body part and the lower body part are integral with each other, the upper and lower body parts are united at two positions spaced equally in opposite directions from a plane which contains the rolling axis and which is parallel to the pivot axis, and wherein the lower body part, together with the rolling means, is movable relative to the upper body part by flexing of the lower body part between a position in which said brake element on the upper body part bears against and prevents rotation of the rolling means mounted on the lower body part and a position in which the brake element is separated from the rolling means.

2. A castor according to claim 1 further characterised in that the spring 24 is intersected by said plane which contains the rolling axis and which is parallel to the pivot axis.

3. A castor according to claim 1 wherein respective ones of the body parts are formed with a spigot and a complementary socket in which the spigot is received when the upper body part moves downwardly relative to the lower body part and the spigot and socket have flat surfaces facing transversely of the pivot axis and which co-operate when the castor is subjected to a heavy downward load and to a turning moment about the pivot axis to ensure that the upper and lower body parts move together about the pivot axis.

4. A castor according to claim 3 further characterised by a flat seat (23) for engagement by a flat end face of the spigot (22) to limit downward movement of the upper body part relative to the lower body part.

5. A castor according to claim 3 or claim 4 wherein said flat surfaces are parallel to the pivot axis.

* * * * *